Nov. 23, 1971     T. O. ERGA     3,621,799
SOIL STEAMING APPARATUS
Filed Sept. 23, 1969
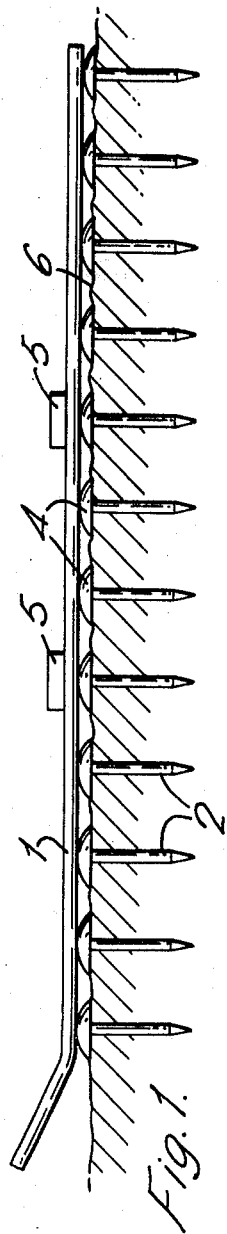
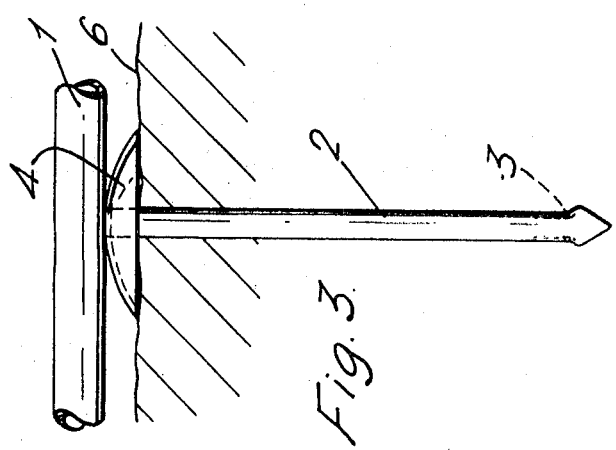
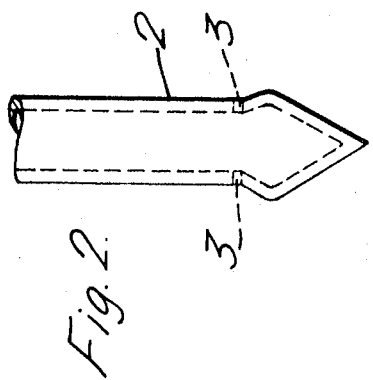
TOR OLAV ERGA
INVENTOR
BY Jacobs & Jacobs
ATTORNEY

United States Patent Office 3,621,799
Patented Nov. 23, 1971

3,621,799
SOIL STEAMING APPARATUS
Tor Olav Erga, Tjotta, Bryne, Norway
Filed Sept. 23, 1969, Ser. No. 860,390
Claims priority, application Norway, Sept. 28, 1968,
3,846/68
Int. Cl. A01g *11/00*
U.S. Cl. 111—6           1 Claim

ABSTRACT OF THE DISCLOSURE

A method for soil steaming comprises penetrating a plastic foil placed on the ground with a plurality of vertical steaming pipes fed by a steam supply pipe, the steaming pipes having caps or hoods at their upper ends, and engaging the plastic foil with the caps or hoods during the steaming to aid in anchoring the foil and to prevent escape of steam.

---

The invention relates to a soil steaming device by means of which steam for disinfection purposes is conducted a distance downwards into the soil through substantially vertically arranged pipe pieces adapted to be urged a corresponding distance into the soil and communicating with a steam supplying pipe located above the ground, said pipe pieces having tapered end portions and being provided with above the peaks located openings or holes for discharging steam below the soil surface.

Soil steaming devices of the kind described suffer from the disadvantage that the discharged steam or at least some of it tends to flow upwards along the pipe pieces and thereby escape into the free atmosphere without having effected any appreciable steaming action on the soil.

An important object of the present invention is to prevent this undesirable steam escape, thus making it possible to utilize to a fuller extent the disinfection action of the steam amount used.

According to the invention said vertical pipe pieces are provided with caps or hoods surrounding the upper ends thereof and located underneath the steam supplying pipe, said pipe piece surrounding caps or hoods being adapted to catch and temporarily collect for subsequent lateral distribution any discharged steam tending to escape into the free atmosphere by flowing upwards along the pipe pieces.

An embodiment of the invention is illustrated on the accompanying drawing, in which FIG. 1 is a side view of the soil steaming device, shown in use;

FIG. 2 shows in a larger scale a detail view of the pipe pieces illustrating the discharge openings or holes;

FIG. 3 shows in a somewhat smaller scale than FIG. 2 a portion of the steam supplying pipe and one single pipe piece.

The steaming apparatus comprises a steam supplying pipe 1 along the under side of which is mounted a number of relatively short pipe pieces extending substantially vertically downwards from the steam pipe 1. The pipe pieces 2 communicate with the interior of the steam pipe 1 and are connected to the latter. The vertical pipe pieces 2 are adapted to be forced downwards into the soil in order to conduct steam a corresponding distance into the soil for disinfection purposes. The ends of the pipe pieces 2 are tapered and above the thus formed peaks are steam discharge holes or openings 3 arranged.

In order to prevent escape of steam into the free atmosphere, i.e. immediate escape of discharged steam the disinfection properties of which has not yet been utilized, said steam tending to follow the exterior of the pipe pieces, the pipe pieces 2 are each provided with a cap or hood 4 surrounding the upper end of the corresponding pipe piece 2 and located beneath the steam supplying pipe 1. In case steam discharged from the holes 3 flows upwards along the pipe piece 2, this steam will be caught by the cap or hood 4 and temporarily collected therein for subsequent distribution in lateral directions.

The soil area to be steamed is by preference covered with a plastic foil or the like. Thereafter a sufficient number of soil steaming devices is placed on top of the plastic foil urging the pipe pieces downwards so that they penetrate the plastic foil. The caps or hoods 4 will then cover the holes made in the plastic foil by penetration of the pipe pieces and thus contribute to the holding of the plastic foil against the soil surface.

What I claim:

1. In a method for steaming soil wherein steam for disinfection purposes is conducted a distance downwards into the soil through substantially vertically arranged pipe pieces adapted to be urged a corresponding distance downwards into the soil and communicating with a steam supplying pipe located above the ground, said pipe pieces having tapered end portions and being provided with holes for discharging steam underneath the soil surface, the improvement which comprises providing said pipe pieces with caps or hoods surrounding the upper ends thereof and located beneath the steam supplying pipe, said caps or hoods being adapted to catch and temporarily collect for subsequent lateral distribution any discharged steam tending to escape into the free atmosphere by flowing upwards along the exterior of the pipe pieces, and further comprising placing a plastic foil over the soil to be sterilized before the pipe pieces are urged into the soil, urging said tapered end portions through said plastic foil and into said soil until said caps or hoods engage said plastic foil, and maintaining said engagement during the steaming, whereby the caps or hoods form pressure members contributing to the holding down of the plastic foil against the soil surface.

References Cited
UNITED STATES PATENTS

| | | | |
|---|---|---|---|
| 1,021,530 | 3/1912 | Johnson | 111—6 X |
| 1,895,335 | 1/1933 | Maxen | 111—6 X |
| 2,874,657 | 2/1959 | Austin | 111—7.1 |
| 2,984,939 | 5/1961 | Russell | 47—58 |
| 3,029,558 | 4/1962 | Odenkirk | 47—1 |

ROBERT E. BAGWILL, Primary Examiner